Figure 1:
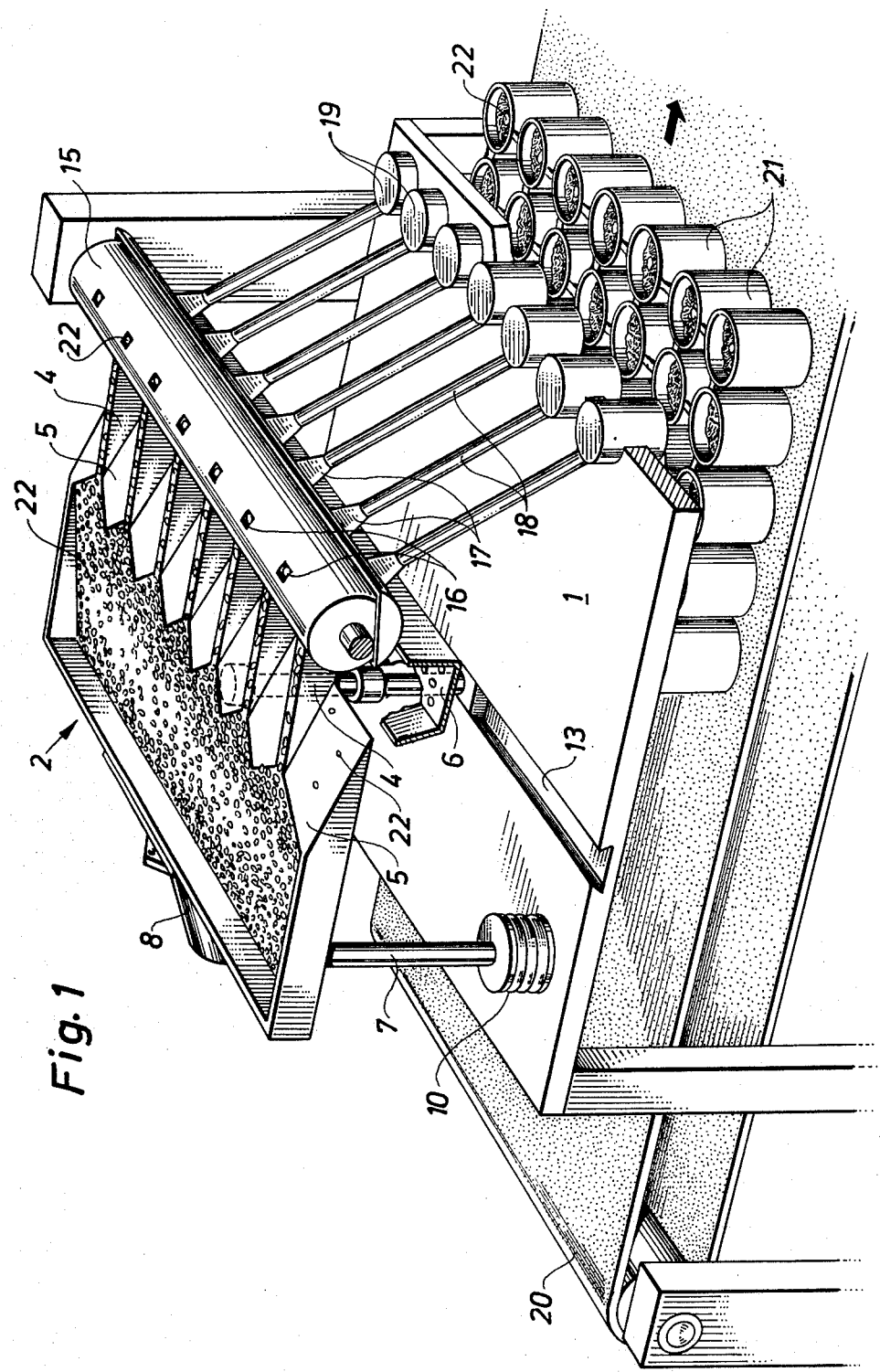

United States Patent [19]

Wendt

[11] 4,046,285
[45] Sept. 6, 1977

[54] METHOD AND APPARATUS FOR PRODUCING SINGLE FLOWS OF GRAINS

[76] Inventor: Karl Lennart Wendt, Box 60, S-910 26, Stocksjo, Sweden

[21] Appl. No.: 685,607

[22] Filed: May 12, 1976

[30] Foreign Application Priority Data

June 5, 1975 Sweden .................................. 7506449

[51] Int. Cl.² ............................................. B65G 47/14
[52] U.S. Cl. .................................... 221/157; 221/204; 221/266
[58] Field of Search ............... 221/178, 179, 157, 180, 221/177, 175, 200, 204, 266, 93; 111/75, 74; 53/244, 247; 47/56, 1, DIG. 9, 73

[56] References Cited

U.S. PATENT DOCUMENTS

| | | | |
|---|---|---|---|
| 2,788,882 | 4/1957 | Swartz et al. | 221/180 X |
| 3,048,132 | 8/1962 | Morgan et al. | 221/266 X |
| 3,065,879 | 11/1962 | Jennings et al. | 221/266 X |
| 3,417,542 | 12/1968 | Merrill et al. | 221/93 X |

Primary Examiner—Stanley H. Tollberg
Attorney, Agent, or Firm—Sughrue, Rothwell, Mion, Zinn and Macpeak

[57] ABSTRACT

A method of diverting from a supply of grains a plurality of parallel intermittent single flows of grains, especially for sowing one seed in each one of a number of plant growing pots. The method comprises the steps of causing the grains of the supply to move in a definite direction on a plane support by utilizing vibration feed, and dividing the resulting wide grain flow into a plurality of parallel single-row flows by guiding said wide grain flow into a corresponding number of grain paths connected to said plane. For this purpose each of said grain paths is designed so as to be able to convey only a single row of grains. Further, each grain path cooperates with one grain-carrying cavity for transferring the grains one by one to said cavity which rotates about an axle and discharges the grains at predetermined time intervals in accurately determined positions after rotation through a certain angle.

7 Claims, 2 Drawing Figures

METHOD AND APPARATUS FOR PRODUCING SINGLE FLOWS OF GRAINS

This invention relates to a method of diverting from a supply of grains a plurality of parallel intermittent single grain flows. The invention also relates to an apparatus for carrying out the method.

In the present description and in the claims the word grain is used as a comprehensive term for all kinds of small particles regardless of shape. However, as the invention is of special value in handling nonspherical particles which is difficult with prior art apparatuses it will be described below for use in connection with seeds which commonly are ovale in shape.

In large-scale growing of plants in pots, the method of sowing the seeds in the pots must meet high requirements as regards speed and accuracy. The sowing must be carried out so that each pot with safety is supplied with a single seed. If more than one seed are sown in a pot, excess plants must be sorted out, and if no seed at all is sown in a pot, a value equal to the pot cost is lost. The empty pots, moreover, participte in the subsequent handling operations and require transportation and storage space. This sorting-out work and the empty pots represent every year high extra costs for the plant nurseries where, for example, a large establishment for growing of rooted forest plants can be intended to sow seeds in about 20 million pots during an intensive 6-weeks period every year. In addition to the accuracy requirement, thus, also very high requirements on sowing speed must be met. Prior art sowing apparatuses capable to work at an acceptable speed have not satisfactorily met the requirement of keeping an acceptable low level of the percentage of unsown pots and of pots sown with two or more seeds. These apparatuses, as mentioned above, cause every year substantial extra costs for the plant nurseries.

The sowing apparatuses preferably used to-day are based on the principle, that seeds are adhered by suction to the mouths of suction conduits opening in given positions, which seeds by pressure balance or counter-pressure later on are caused to drop down into pots. One of the most serious disadvantages of these apparatuses is that the suction orifices easily are clogged by loose dust particles, so that the corresponding pots are now sown. Furthermore, two or more seeds can adhere by suction to the same mouth when the tips of the seeds are directed inward to the mouth. This latter phenomenon occurs especially when large suction orifices and/or high vacuum are used in order to minimize the risk that certain pots are not sown.

There exist other sowing apparatuses, in which seeds are to be placed in small bowls or cavities, from which they then are to be transferred into pots. The basic problem here is of the same nature as at the aforesaid pneumatic apparatuses. As the orientation of the seeds is not known when they are to be fed into the boxes the boxes must be dimensioned so large in order to ensure with acceptable safety that a seed is positioned in each box that, as a result thereof, often two or more seeds drop into the same box.

The main object of the invention is to bring about a method and an apparatus for producing single flows of grains which among other things can be adapted to be utilized for sowing seeds in pots and then rendering it possible to sow at high speed and with high accuracy only one seed in each pot.

For achieving this object, according to the invention a plurality of parallel single-row flows of grains are diverted from a wide grain flow, which partial flows are guided each to a grain-carrying means, which rotate about a central axle and to which the grains are transferred one by one. The single-row grain flows are brought about thereby that a wide main flow driven by vibration is guided into narrow grain paths each adapted to convey only a single grain row. The grain paths, for example, can consist of narrow bars with a bowl-shaped edge surface adapted to the grains. Said bars preferably are arranged in spaced relationship, so that grains, which are not guided into the paths formed by the bars or which later on are pressed out of the paths by other grains, drop down between the bars where they are collected and thereafter returned to the said main flow.

In order to ensure that grains always are available for transfer to said grain-carrying means at the moment of their moving past the terminating ends of the grain paths, grains are fed into said paths at a rate exceeding the rate at which said means, which preferably consist of cavities in the envelope surface of a rotary cylinder, remove the grains from the paths. As a result thereof, a queue or string of grains is formed in each path, and the length of the string is determined for example, by the feed effect. The pressure on the grains farther ahead in the string increases with the feed effect and the string length and, when the pressue becomes too high it causes grains be pressed out of the path which grains are returned, as stated above. The grains in said strings are pressed against each other and, if they are non-spherical in shape they will turn by mutual action to be uniformly oriented in the string. Oval-shaped seeds, for instance, will turn so that their longitudinal axes will form right angles with said paths. This implies that the grain or seed farthest ahead in each string always lies oriented in a predetermined direction and, therefore, the grain-carrying cavities can be dimensioned optimally, thereby minimizng the risk that one cavity will carry along more than one seed.

In order to reduce the risk of stoppages at the inflow of grains from the wide flow into said paths, the means utilized for the inflow are so designed that grains tending to block the access to said paths are pressed up above said means and out into the return system. As, however, the inflow to said paths usually to some extent is varying in time, it is desirable, in order to ensure that grains always will be available in position for being taken along by said cavities, that the grains after they have been fed into said paths are given a higher speed. At the utilization of vibration feed this higher speed preferably can be effected thereby that the plane, over which the wide flow is passed, forms a certain angle relative to the plane for said paths, and that owing to said angle the speed of the grains in said wide flow is somewhat reduced.

As is apparent from the aforesaid, it is according to the invention of greatest importance that in each path an active queue or string of grains is obtained, i.e. a string in which the grains have a dammed-up tendency of moving forward to the cylinder so that, as soon as a grain is taken along by a cavity in the cylinder or a grain is pressed out of the string and drops down into the return system, the remaining grains immediately move toward the cylinder through a distance corresponding to one grain width.

The special features characterizing the method and apparatus according to the invention are apparent from the claims.

Figure 2:
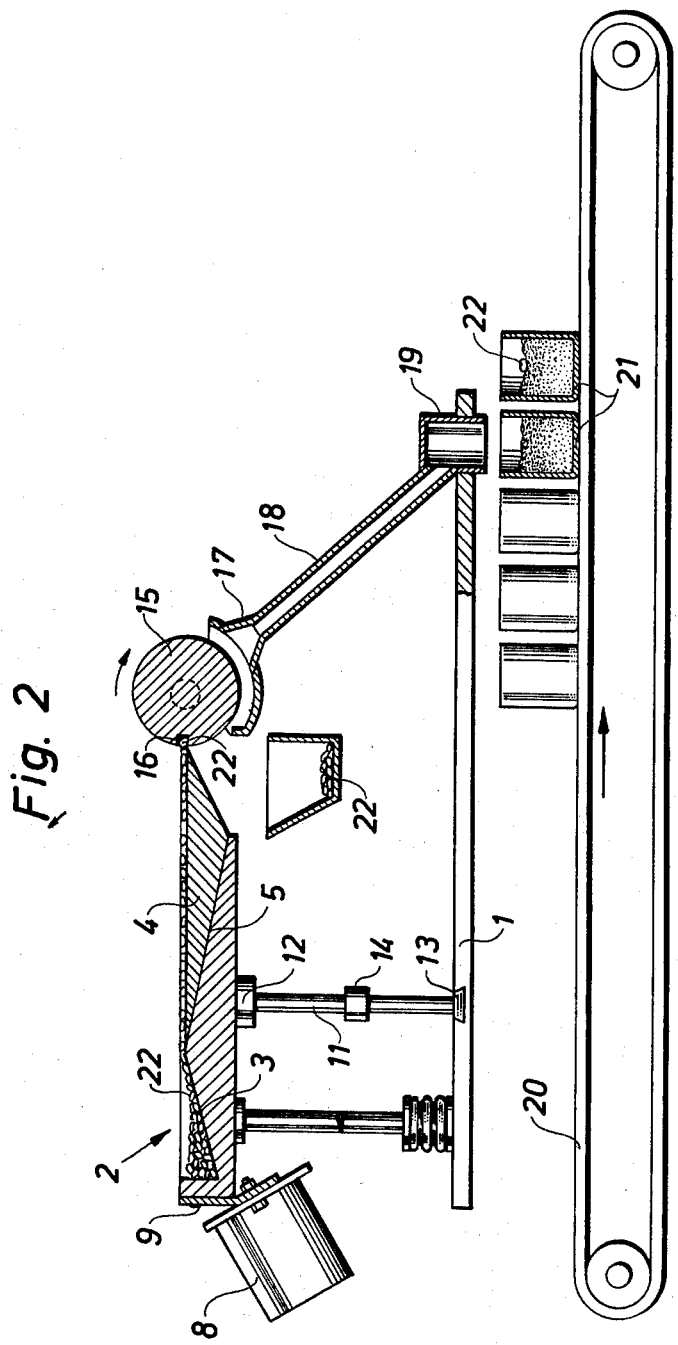

The invention is described in greater detail in the following, with reference to the embodiment shown by way of example in the accompanying drawings, in which FIG. 1 is a schematic perspective view of a sowing apparatus designed in accordance with the invention, and FIG. 2 is a lateral view, partially in section, of said apparatus.

As appears from the Figures, the sowing apparatus comprises a support plate 1 provided with four legs carrying a seed feed table 2. Said table 2 comprises a plane plate-shaped portion 3 transforming at one edge into a number of beams or bars 4. Between said bars 4 plane deflecting surfaces 5 are located, the upper left-hand edge portions of which are designed as beveled plough-shaped guide surfaces slightly elevated over the surface of the portion 3. The upper edge surfaces of the bars 4 are bowl-shaped to form paths, each capable of holding only one single-row of the seeds 22 to be sown.

As is most clearly apparent from FIG. 2, the plate-shaped portion 3 is inclined slightly upward to the bars 4, which are substantially horizontal. The deflecting surfaces 5 between said bars are inclined downward to a collecting receptacle 6. For feeding the seeds on said plane as well as on the bars 4, in known manner a vibrator means 8 is used, which is attached to the seed feed table 2 by a fastening iron 9. The feed table 2 is supported on two rear support legs 7 attached to the support plate 1 via rubber dampers 10 and one front support leg 11, the upper end of which is provided with a rubber damper 12 abutting the feed table. The support leg 11 is laterally movable in a groove 13, and its length is adjustable by control means 14.

At the forward end of the seed transport paths formed by the bars 4 a rotary cylinder 15 is mounted. In the envelope surface of said cylinder 15 a cavity 16 is provided directly in front of each of said seed paths. On the side of the cylinder opposed to said paths a funnel-shaped seed-catching member 17 is attached directly in front of each of said cavities. Each member 17 is connected via a tube 18 to a downwardly open hood 19 provided in the support plate 1.

At the apparatus shown, a conveying belt 20 is mounted beneath the support plate 1 and arranged to advance in steps sow pots 21 into position beneath said hoods 19. The cylinder 15 and belt 20 can be driven synchronously by a motor (not shown).

The apparatus described above operates as follows. On the plate-shaped portion 3 of the feed table 2 a large amount of seeds 22 are placed which by the vibration generating means 8 are driven forward in the form of a wide flow in the direction toward the inlets of the seed paths formed by the bars 4. In said wide flow each individual seed moves relatively slowly and irregularly as regards direction and speed. The flow in its entirety, however, is continuous and has a definite direction. When the flow approaches the bars 4, the seeds are guided together into a plurality of parallel, increasingly narrowing flows by means of the upper beveled edges of the deflecting surfaces 5 which act as guide surfaces. When these flows arrive at the bars 4, they consist of single rows of seeds. The seeds 22 obstructing to being guided by said guide surfaces pass over the beveled edges thereof and via the deflecting surfaces 5 to a collecting receptacle 6. The seeds collected in the receptacle 6 are in a suitable manner returned to the seed supply on the feed table. Due to the tendencies of forming temporary plugs in the guiding passage to the separate seed paths, the total seed flow there will be accidentally intermittent to continuous. After the seeds have been guided out onto the bars 4, nothing impedes their movement any longer, and the seeds rapidly and continuously are advanced to the cylinder 15. The total amount of seeds passing per time unit through a cross-section of this passage will vary somewhat due to the said temporary plugs.

In view of the irregular supply of seeds from said portion 3, the feed speed for the seeds in said paths is chosen so that the respective seed path portion located closest to the cylinder 15 will contain a queue or string of seeds. The envelope surface of the cylinder provides a hold-up for the seed advancement. This hold-up is removed only during the short periods when a cavity moves past the end of the respective seed path. The string of seeds then moves through a distance corresponding to the width of one seed and is again stopped. As the seeds in the string tend to move ahead, a pressure arises in the string and causes the seeds to turn so that their longitudinal axis is oriented perpendicularly to the feed direction, thereby facilitating to a high degree the feed into the cavities in said cylinder envelope.

It is of critical importance, as stated above, that there is always a string of seeds in all seed paths. When a string becomes too long, the pressure on the seeds further ahead in the string increases so that one or several seeds are pressed out of the string and drop down into the return flow for excess seeds, whereby the pressure in the string is relieved. The string length, thus, can to some extent be adjusted by the feed effect. The individual seeds in the strings in front of the cylinder move randomly intermittent, partly because the seeds regularly are discharged from the strings and partly because the seeds at random are pressed out of the strings.

The seeds 22 transferred from said strings to the boxes 16 in the cyliner 15 are discharged at pre-set intervals into said funnel-shaped collecting members 17, from which they are supplied via the tubes 18 and hoods 19 to the pots 21. Each of the final flows of seeds via each hood 19 is regularly intermittent, which is a prerequisite conditon for a sowing apparatus sowing in pot sets.

By inclining the plate-shaped portion 3 at a certain angle in relation to the seed paths on the bars 4, one and the same vibration generating means 8 can be utilized both for effecting a relatively slow wide flow on the portion 3 and a considerably more rapid flow in the paths on the bars 4. It is important that seeds, which either obstruct to being guided into the paths on the bars 4 or lateron are pressed out of the paths, are permitted to move out of the way in order not to disturb the seed flow adjacent the cylinder 15. The shown receptacle 6 for collecting such seeds can be exchanged against a suitable conveying means, which automatically returns the seeds to the seed supply on the feed table 2. The deflecting surfaces 5 are not critical, but can, if desired, be omitted, in which case, however, the collecting means is to be completed with a catching means.

In the embodiment shown the seeds 22 are guided down to definite pots 21 via the member 17, tube 18 and hood 19. It is, however, also possible to arrange the pots 21 so that they pass so closely beneath the cylinder 15 that no further means for guiding the seeds to the pots are required. In the embodiment described the conveying belt 20 is intended to advance the set of pots 21 in steps, so that at each revolution of the cylinder 15 sowing is effected in one pot set. If desired, however, the cylinder can be provided with several cavities about its periphery. It is also possible to arrange two or more sowing apparatuses according to the invention so that they operte on the same pot set, and sowing takes place in all pots in the set during one cycle of the apparatuses.

The cylinder 15 can be driven continuously or intermittently. Preferably it is driven intermittently in such a manner, that it stops for a short period in the position in which the seeds 22 are fed into the cavities 16.

The invention can also be varied in other respects within the scope of the claims. The shape of the feed paths on the bars 4, for example, can be changed and, instead of by means of an impression in the bars, be obtained, for example, by providing the bars with low edgings. Said seed paths may also form a certain angle with the horizontal plane and, for example, be slightly inclined downward to the cylinder 15. Further, the cavities may be replaced by other grain-carrying means, such as suction holes provided the problems arising due to clogging of the holes can be solved. Although the invention has been described in connection with handling of seeds it is evident that the apparatus described can be utilized for handling small particles of grains of any kind.

What is claimed is:

1. A method of diverting from a supply of grains a plurality of parallel intermittent single flows of grains, comprising the steps of: moving the grains of the supply in a definite direction on a plane support by utilizing vibration feed, dividing the resulting wide grain flow into a plurality of parallel single-row flows by guiding said wide grain flow into a corresponding number of grain paths connected to said plane, each grain path being designed so as to be able to convey only a single row of grains, adjusting the vibration feed to cause the grains on said paths to turn by mutual action to a uniform orientation, transferring the grains from said grain paths one by one to means rotating about an axle and discharging the grains at predetermined time intervals from said rotating means in accurately determined positions, wherein said rotating means is a rotary cylinder, and further including the steps of: feeding per time unit more grains into said paths than are removed by said rotary cylinder for forming in each path a string of grains abutting each other and the envelope surface of the cylinder, permitting excess grains to be pressed out of said paths and collected and later on returned to the grain supply.

2. A method according to claim 1, comprising the step of causing the grains to move at a higher speed in said paths then on said plane.

3. An apparatus for deriving from a supply of grains a plurality of parallel intermittent single flows of grains comprising: a rotary cylinder, said cylinder having a plurality of grain-carrying cavities arranged in the surface of said cylinder, said cylinder disposed for rotation about an axle, a vibration feed device including a plane plate-shaped portion, one edge of said plate connected to a plurality of grain paths, each path being formed so as to permit transport of only a single row of grains to a terminating end thereof, said cylinder arranged so as upon its rotation to pass the terminating end of an associated grain path and at each passage receive one grain, respectively, into said cavities, whereby upon additional rotation of said cylinder, said grain is discharged in an accurately determined position, and wherein said vibration generating device adapted to feed per time unit more grains into said paths than are removed by the cavities in said cylinder, so that in each path a string of grains abutting each other and the envelope surface of the cylinder will be formed, and a collecting device to receive grains pressed out of the paths.

4. An apparatus according to claim 3 wherein said vibration feed produces a higher grain speed in said paths than on said plate-shaped portion.

5. An apparatus according to claim 3, wherein said plate-shaped portion is inclined slightly upward to said paths, which are substantially horizontal.

6. An apparatus according to claim 3, wherein said paths consist of narrow bowl-shaped bars arranged in spaced relationship.

7. An apparatus according to claim 3, comprising plough-shaped means for guiding a wide grain flow on said plate-shaped portion into said parallel grain paths, said means having beveled edge surfaces permitting grains tending to form plugs in the inlets to the grain paths be pressed up over said means.

* * * * *